United States Patent [19]
Dryer

[11] 4,307,753
[45] Dec. 29, 1981

[54] WIDE FREQUENCY PULSATION DAMPENER DEVICE

[75] Inventor: Eldon O. Dryer, Malibu, Calif.

[73] Assignee: Greer Hydraulics, Incorporated, Chatsworth, Calif.

[21] Appl. No.: 173,281

[22] Filed: Jul. 29, 1980

[51] Int. Cl.³ .............................................. F16L 55/04
[52] U.S. Cl. ........................................ 138/30; 138/31
[58] Field of Search ............................ 138/26, 30, 31; 220/85 B; 181/233; 417/540

[56] References Cited

U.S. PATENT DOCUMENTS

| | | | |
|---|---|---|---|
| 862,867 | 8/1907 | Eggleston | 138/30 X |
| 3,028,881 | 4/1962 | Koomey et al. | 138/30 |
| 3,741,692 | 6/1973 | Rupp | 138/31 |
| 3,862,708 | 1/1975 | Waxlax | 138/30 X |

*Primary Examiner*—James E. Bryant, III
*Attorney, Agent, or Firm*—Arthur B. Colvin

[57] ABSTRACT

A pulsation dampener device particularly adapted for the efficient dampening of pulsations over a wide frequency range. The device is characterized by the ability to operate over a high temperature range and be operable when contacted by corrosive and like aggressive fluids within which pulses are generated. The device includes a pressure vessel which is cylindrical in section, a piston member shiftable axially within the vessel and dividing the same into a gas chamber and a fluid chamber, the piston incorporating a deflectible diaphragm disposed within a permeable cage whereby dampening may be effected by either or both of a bodily movement of the piston within the vessel or by deflecting movements of the diaphragms within the cage.

11 Claims, 4 Drawing Figures

WIDE FREQUENCY PULSATION DAMPENER DEVICE

BACKGROUND OF THE INVENTION

1. Field of the Invention

The present invention is in the field of hydraulic accumulator devices and relates more particularly to an accumulator device especially useful as a pulsation dampener in situations where pulses of wide frequency range are encountered. The invention is further in the field of an dampener of the type described which may be used in high temperature applications and in conjunction with aggressive liquid materials.

2. The Prior Art

It is conventional to incorporate pulsation dampener devices in hydraulic systems as a means for reducing the amplitude of pulses generated, for instance, in pumping apparatuses associated with the system.

In the undampened systems of the type described the pulses generated may have deleterious effects on components downstream of the pump, and if the pulses are at a frequency which happens to resonate with elements of the system, actual damage may result to conduits and other components of the system.

Representative examples of pulsation dampeners of the type described which are effective over a wide frequency range may be found in U.S. Pat. Nos. 3,509,916; 3,920,047 and 3,930,521. Such devices typically comprise a pressure vessel having at one end a gas charging port and at the other end an oil port for the admission of hydraulic fluid or other liquids which are treated by a pump and are, thus, subject to surges in pressure as resulting from the cycles of the pump, etc.

The pressure vessel is typically divided into two chambers which are isolated from each other by a distensible bladder member which, where the pressure in the gas chamber exceeds that of the oil chamber, forces oil through the oil port of the pressure vessel. Where the pressure in the hydraulic system exceeds that in the gas chamber, fluid is admitted into the oil chamber, further compressing the gas in the bladder and storing energy therein, which stored energy is released to the fluid when the hydraulic pressure drops to a value below the gas pressure. Bladder type accumulators of the type described are, to a degree, capable of dampening pressures through a wide frequency range.

Since, for the successful operation of such prior art devices, it is necessary to employ a stretchable bladder it will be readily recognized that the choice of materials of which the bladder may be comprised is quite limited, such materials typically comprising an elastomeric substance such Buna rubber or the like.

However, the use of pulsation dampeners of the type described cannot be attempted in connection with liquids at temperatures higher than the tolerance temperatures of the elastomeric bladder as the bladder would be rapidly destroyed. Similarly, where the liquid is corrosive to the bladder or incorporates entrained granular material, conventional bladder type accumulators are likewise unacceptable.

In a further type of accumulator, the oil and gas chambers may be separated by a rigid piston member sliding in a cylindrical bore defined by the pressure vessel. While such piston type dampener may effectively resist the corrosive action of hot or aggressive liquids, and also may be effective in dampening low frequency, high amplitude pulses, the same is generally ineffective where high frequency pulses are encountered due to the large inertia of the piston.

SUMMARY OF THE INVENTION

The present invention may be summarized as directed to a pulsation dampener device of the accumulator type comprising a pressure vessel defining a cylindrical bore having a gas charging valve or port at one end and an oil or liquid port at the other. The interior of the vessel is divided into two chambers by a piston assembly characterized in that the piston head is comprised of a relatively lightweight pervious cage defined by upper and lower cage halves. The periphery of the piston is provided with a seal member which slidably engages the bore of the pressure vessel. The space between the cage halves is filled with a lightweight diaphragm of resilient, flexible material, the diaphragm and peripheral seal together forming a fluid-tight construction whereby the piston head effectively divides the interior of the vessel into two discrete chambers.

The peripheral seal and diaphragm may be formed of a high and low temperature wear and corrosion resistant material, such as a fluorocarbon of the type put out by Dupont under its trademark "Teflon".

The described device is capable of dampening low frequency, high amplitude pulses by bodily movement of the piston within the bore of the pressure vessel. High frequency, low amplitude pulses are likewise effectively dampened by movement of the diaphragm within the cage.

Accordingly, it is an object of the present invention to provide a pulsation dampener of the pressure accumulator type which is capable of dampening pulses over a wide frequency and amplitude range and is nonetheless useful in dampening pulses encountered in high temperature applications, or in connection with aggressive fluids.

A further object of the invention is the provision of a dampener of the type described having a low inertia diaphragm for the dampening of high frequency pulses and a piston head movable axially of the pressure vessel for the dampening of pulses of low frequency but large amplitude.

To attain these objects and such further objects as may appear herein or be hereinafter pointed out, reference is made to the accompanying drawings forming a part hereof in which.

Figure 1:
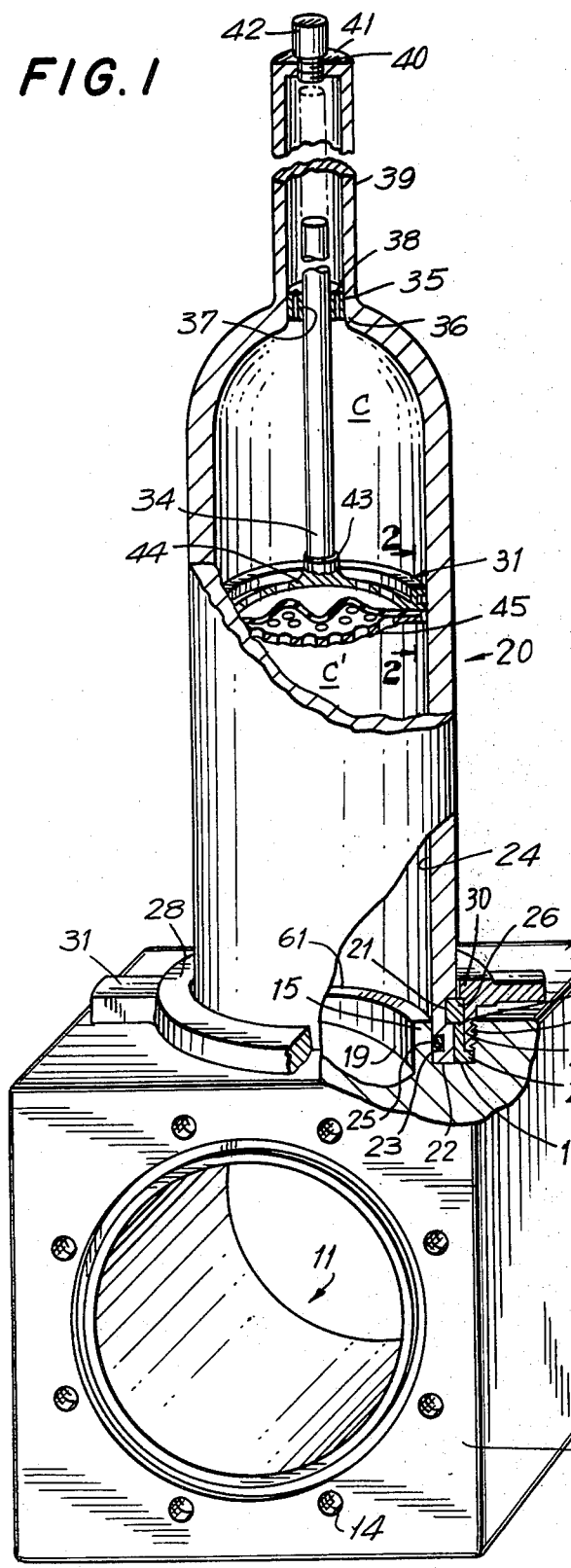
FIG. 1 is a perspective view of an accumulator device in accordance with the invention, with parts broken away to show details of construction.

Turning now to the drawings, there is shown in FIG. 1 a housing 10 of metal having a through-going passage 11. The end walls 12, 13 of the housing 10 surrounding the passage 11 are provided with fittings for the attachment thereto of the flanges of a hydraulic line or conduit.

In the illustrated embodiment, a plurality of tapped attachment apertures 14 circumferentially surrounding the terminal ends of the passage 11 provide anchor points for bolts which extend through the conventional flange portions of fittings (not shown) on the hydraulic line, it being understood that gasket means will be interposed between the flanges and the walls 12, 13 to assure a liquid-tight connection.

The housing 10 includes an upwardly directed integral annular skirt 15. Surrounding and in spaced relation to the skirt 15 there is formed on the upper face 16 of the housing an annular recess 17 bounded by an internally threaded outer wall 18. The housing includes an upwardly directed branch passage 19 in connection with the through passage 11. A pressure vessel 20, which is generally cylindrical in transverse section, is mounted to the housing 10 in a manner hereinafter to be described.

The vessel 20, on its outer wall, includes a circumferential annular groove 21 adjacent the base 22 of the vessel. An inwardly facing O-ring retainer groove 23 is formed in the inner wall 24 adjacent the base 22, an O-ring member 25 being mounted within the groove 23.

To mount the vessel the halves of a split ring 26 are seated in the groove 21. A stop washer 27, which is generally L-shaped in vertical section, is mounted in the recess 17. A spanner nut assembly 28 is sleeved over the pressure vessel, the spanner nut assembly included an externally threaded depending collar 29 which is engaged with the threaded portion 18 of the housing. The spanner nut assembly includes an inwardly directed drive shoulder 30 which bears against the outwardly projecting shoulder of the split ring 26. The spanner nut assembly may include radial drive spokes 31 for facilitating tightening of the same.

It will be appreciated that when the spanner nut assembly 28 is threaded into the housing 10, the shoulder 30 thereof, reacting against the split ring, drives the pressure vessel downwardly until the undersurface of the split ring 26 engages downwardly until the undersurface of the split ring 26 engages against the upwardly facing shoulder 32 of the stop washer 27, clampingly supporting the pressure vessel in position on the housing. In this position the O-ring 23 defines a tight seal against the outer surface of the skirt 15, whereby a pressure-tight connection between the housing and the pressure vessel is defined. Obviously, other means may be provided for securing the pressure vessel to the housing in a sealed manner while providing communication between the passage 19 in the housing and the interior of the pressure vessel.

The pressure vessel is divided into upper and lower chambers C,C' by a piston head assembly 31 mounted on the lower end of a piston rod 34.

The piston rod 34 is guided for axial sliding movement by a bushing 35 mounted within restricted neck 36 adjacent the upper end of the pressure vessel. The bushing 35, which is secured as by welding or a force fit at the neck 36, includes an internal diameter 37 defining a sliding fit with the exterior of the rod 34. The bushing 35 is provided with one or more axially directed by-pass passages 38.

A tubular piston rod receptor chamber 39 is formed as an upward extension of the neck 36, the length of the chamber being coordinated with the length of the rod 34. A gas charging port 40 is formed, preferably at the upper end 41 of the neck 36, the port having mounted thereon a gas charging valve assembly 42, as is conventional.

Ths piston head assembly 31, which is affixed as at 43 to the lower end of the rod 34, comprises upper and lower pervious cage portions 44, 45, respectively.

Figure 2:
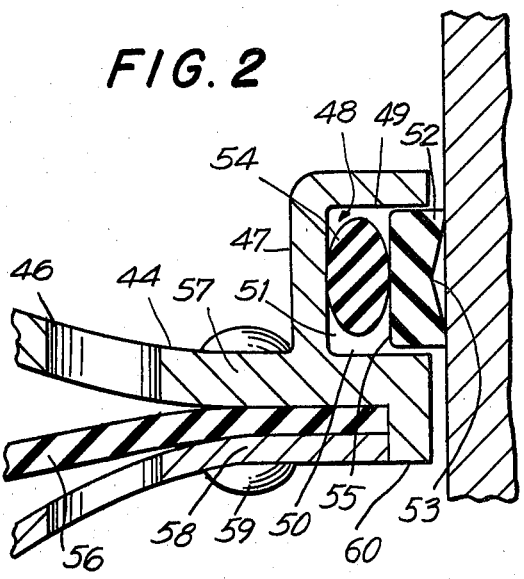
FIG. 2 is a magnified sectional view taken on line 2—2 of FIG. 1.

Referring now more particularly to FIG. 2, the upper cage 44 is downwardly concave and includes a plurality of through-going apertures or passages 46. The cage 44 includes a peripheral annular extension 47 having an outwardly facing U-shaped seal receiver chamber 48.

Chamber 48 includes an upper wall portion 49, a lower wall portion 50 and an outwardly directed side wall portion 51. A seal is provided by a gasket member 52 which is preferably formed of Teflon or like anti-friction, heat and corrosion resistant material. The gasket 52 may include an outwardly facing V-shaped surface 52 having a dimension intimately engaging the cylindrical bore 24 of the pressure vessel. The gasket 52 is urged radially outwardly by an elastomeric collar member 54 biased between the wall 51 and the inner face 55 of the gasket 52. It will thus be seen that the outer surface 53 of the gasket 52 is urged radially against the bore 24, providing both a sealing action as well as a dirt and detritus excluding action with the bore.

A diaphragm member 56 is sandwiched between flange-like peripheral portions 57, 58 of the upper and lower cages 44, 45, respectively, the peripheral portion of the diaphragm being clamped between the noted parts as by a plurality of rivet members 59.

The diaphragm 56, which is likewise preferably formed of Teflon or an equivalent material, is illustratively corrugated by a series or concentric ridges or corrugations whereby the same is rendered flexible and readily distensible in an upward and downward direction.

The composite piston head assembly 31 comprised of the upper and lower cages, diaphragm and peripheral seal assembly provides a liquid-and gas-tight barrier within the bore isolating the chamber C from the chamber C'.

The operation of the device will be apparent from the preceding description.

Assuming a hydraulic line to be connected at the opposite terminals of the passage 11 of the housing 10, and assuming the chamber C to be charged with gas under pressure, the piston rod and associated piston head assembly 31 will be urged axially downwardly toward the lower end 22 of the pressure vessel. At its lowermost position a depending annular shoulder 60 of the piston head assembly will seat against the upwardly facing annular surface 61 at the uppermost end of the skirt 15.

It will thus be apparent that so long as the pressure within chamber C is greater than the pressure within the conduit 11 of the housing, the piston will be disposed in closing relation of, and adjacent the lower end 22 of the pressure vessel, and the diaphragm will line the lower cage 45. When pressures within the hydraulic system exceed those within the chamber C, the volume of the chamber C' will increase and the volume of the chamber C will be decreased, compressing the gas within the chamber C.

The decrease in volume can be accomplished either by an upward deflection of the diaphragm 56 or by a composite upward deflection of the diaphragm and upward shifting movement of the piston head 31.

Where high frequency, low amplitude pulses are sensed, the diaphragm 56 is free to readily flex upwardly with minimal inertia, and the system is sufficiently compliant to dampen such pulses with minimal or no movement of the piston head.

Where low frequency, high amplitude pulses are encountered, the same are dampened by a shifting movement of the diaphragm within the cage and an upward bodily movement of the piston head and piston rod assembly.

There is thus provided in accordance with the invention a dampening device with the ability to respond rapidly to high frequency fluctuations and which is nonetheless capable of dampening substantially large amplitude, low frequency pulses.

Figure 3:
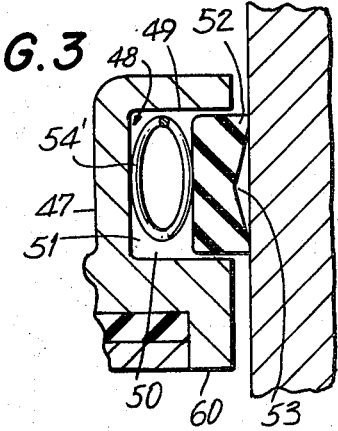
FIG. 3 is a view similar to FIG. 2 showing a modified peripheral seal arrangement.

In the embodiment of FIG. 3 wherein like parts have been given like reference numerals, the assembly is substantially identical except that a garter spring 54' has been employed to provide the outward radial seating pressure on the peripheral seal 52.

Figure 4:
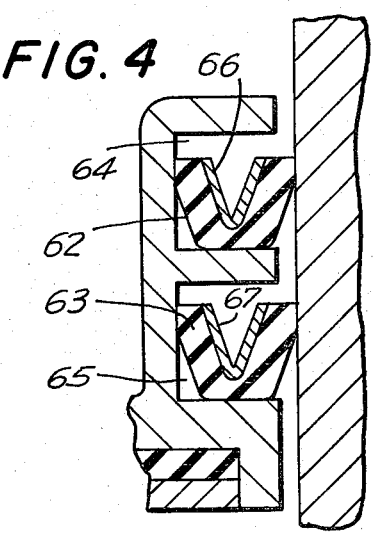
FIG. 4 is a view similar to FIG. 3 showing a further embodiment of the peripheral seal.

In accordance with the embodiment of FIG. 4, two seal members 62, 63 are housed in axially spaced upper and lower chamber 64, 65, respectively, formed in the periphery of the piston head assembly 31.

The seal member 62, 63 preferably comprise annular Teflon washers which are V-shaped in transverse section, each of the said washers including an annular diametal spreader member 66, 67, respectively, which forcably bias the washers against the bore 24 of the pressure vessel.

It will be observed that since the peripheral sealing washer and the diaphragm member are made of Teflon or a material having like characteristics, they are resistant to high temperature and corrosive fluids while nonetheless providing an ability to dampen pulses of a wide frequency range.

As will be appreciated by one skilled in the art and familiarized with the instant disclosure, numerous variations in constructional details may be made without departing from the spirit of the invention, which is to be broadly construed within the scope of the appended claims.

While the illustrated embodiments have been displayed in connection with a piston head fixed to an axially shiftable piston rod, it will be readily recognized that the piston head may be made self-guiding and the rod dispensed with.

Having thus described the invention and illustrated its use, what is claimed as new and is desired to be secured by Letters Patent is:

1. A hydraulic pulsation dampener device for the dampening of pulses of a wide frequency range in hot or corrosive liquids or the like comprising a pressure vessel having a cylindrical bore, an oil port at one end of said bore, a housing supporting said one end, said housing including a passage in communication with said oil port and adapted to receive fitting means for connecting said passage to a hydraulic line, a closed end formed at the other end of said vessel, said closed end including an elongate tube member, a gas charging port formed in said tube member, a guide bushing formed adjacent said closed end, said bushing including a bearing aperture aligned with the axis of said bore, a by-pass passage surrounding said bearing aperture, a piston rod slidably guided in said aperture for reciprocal movements axially of said bore, a piston head mounted on the end of said rod nearest said oil port, said head including a peripheral seal portion in sliding engagement with said bore and upper and lower spaced perforate cage portions, a diaphragm mounted between said cage portions, said piston head dividing said bore into two isolated chambers in communication, respectively, with said oil port and said gas port.

2. Apparatus in accordance with claim 1 wherein the volume of said chambers is varied responsive to movements of said diaphragm within said cages and movements of said piston head relative to said bore.

3. Apparatus in accordance with claim 1 wherein said diaphragm is shifted into lining relation of one of the other of said cages selectively, depending upon the relative pressure in said chambers.

4. Apparatus in accordance with claim 1 wherein pulses within said passage of high frequency and low amplitude are dampened principally by movements of said diaphragm relative to said cages, and pulses of low frequency and high amplitude are dampened principally by bodily movements of said piston head within said bore.

5. Apparatus in accordance with claim 1 wherein each said cage comprises a concave member, each said cage terminating in a planar flange portion, said diaphragm being clampingly disposed between the opposed flange portions of said cages.

6. Apparatus in accordance with claim 5 wherein said diaphragm and said peripheral seal comprise Teflon.

7. A hydraulic pulsation dampener device for the dampening of pulses of a wide frequency range in hot or corrosive liquids or the like comprising a pressure vessel having a cylindrical bore, an oil port at one end of said bore, adapted to be connected to a hydraulic line, a closed end formed at the other end of said vessel, a gas charging port formed in said closed end of said vessel, a piston head assembly mounted for reciprocal movement in said bore, said head including a peripheral seal portion in sliding engagement with said bore and upper and lower spaced perforate cage portions, a diaphragm mounted between said cage portions, said diaphragm comprising a resilient polymeric material, said piston dividing said bore into two isolated chambers in communication, respectively, with said oil port and said gas port, said diaphragm being shifted into lining relation of one or the other of said cages selectively responsive to pressure differentials within said chamber, the volume of said chambers being a function of the position of said head in said bore and the position of said diaphragm between said cages.

8. Apparatus in accordance with claim 7 wherein pulses of high frequency and low amplitude are dampened principally by movements of said diaphragm within said cages, and pulses of low frequency and high amplitude are dampened principally by movements of said head within said core.

9. Apparatus in accordance with claim 8 wherein each said cage comprises a concave member terminating in a surrounding annular flange portion, and said diaphragm has a peripheral portion clampingly disposed between the opposed flange portions of said cages.

10. Apparatus in accordance with claim 9 wherein said diaphragm and said peripheral seal are formed of Teflon.

11. Apparatus in accordance with claim 10 wherein said diaphragm is of corrugated configuration in its unstressed condition.

* * * * *